United States Patent
Martens et al.

(10) Patent No.: US 7,099,523 B2
(45) Date of Patent: Aug. 29, 2006

(54) METHOD AND SYSTEM FOR SCALING A SIGNAL SAMPLE RATE

(75) Inventors: Marco Martens, Chappaqua, NY (US); Tomasz J Nowicki, Briarcliff Manor, NY (US); Jennifer Q. Trelewicz, Superior, CO (US); Timothy James Trenary, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 10/198,097

(22) Filed: Jul. 19, 2002

(65) Prior Publication Data

US 2004/0015525 A1  Jan. 22, 2004

(51) Int. Cl.
*G06K 9/32* (2006.01)

(52) U.S. Cl. .................. 382/300; 382/252; 382/298; 358/3.03; 358/426.16; 708/313; 375/240.27; 375/240.24

(58) Field of Classification Search .......... 382/252, 382/298; 358/3.03, 426.16; 708/313; 375/240.27, 375/240.24
See application file for complete search history.

(56) References Cited

U.S. PATENT DOCUMENTS

| | | | | |
|---|---|---|---|---|
| 5,581,306 A | * | 12/1996 | Ohara | 348/625 |
| 5,928,313 A | * | 7/1999 | Thompson | 708/313 |
| 6,108,047 A | * | 8/2000 | Chen | 348/581 |
| 6,650,783 B1 | * | 11/2003 | Hamanaka | 382/240 |
| 6,778,707 B1 | * | 8/2004 | de Queiroz | 382/233 |
| 6,839,468 B1 | * | 1/2005 | Mitchell et al. | 382/250 |

OTHER PUBLICATIONS

Pennebaker et al., *JPEG Still Image Data Compression Standard*, (1993), pp. 27-64.
Marcon Martens, "Hybrid Domain Processing of Multi-Dimensional Transformed Data", (U.S. Appl. No. 09/588,477 filed on Jun. 7, 2000).

* cited by examiner

*Primary Examiner*—Sheela Chawan
(74) *Attorney, Agent, or Firm*—McGinn IP Law Group, PLLC; Stephen C. Kaufman, Esq.

(57) ABSTRACT

A method for scaling a signal sample rate includes interpolating between at least two scaling ratios to calculate an arbitrary scaling ratio, using a predetermined interpolation algorithm, and scaling a sample rate for a first portion of the signal using a first scaling ratio, and scaling a sample rate for a second portion of the signal using a second scaling ratio, to form a scaled signal having an average scaling ratio equal to the arbitrary scaling ratio.

25 Claims, 3 Drawing Sheets

METHOD AND SYSTEM FOR SCALING A SIGNAL SAMPLE RATE

BACKGROUND OF THE INVENTION

1. Field of the Invention

The present invention relates to a method and system for scaling the sample rate (e.g., the time or spatial sample rate) of a signal and more particularly, a method and system which may scale a signal sample rate in a transform domain, in the sample domain, or between domains.

2. Description of the Related Art

Compressed signals often need to be scaled in real-time, high-throughput, signal processing systems. For example, a server may provide a wavelet-compressed image at one resolution, but a client personal digital assistant (PDA) may require the image at a different resolution. This PDA resolution is only known at the time of download request, and the scaling must be performed efficiently, either at the server or at the PDA. Thus, scaling must be performed in real time. If the scaling is performed at the PDA, limited processing resources may be available for the operation because of space/power/weight/cost concerns, potentially making the task even more challenging.

Similarly, a production printer (e.g., several hundred impressions per minute, or ipm) may receive a customer job to print in real time, in an encoded print data stream. If a JPEG image (e.g., an image compressed according to a standard developed by the Joint Photographic Experts Group), is embedded in the data stream, the image must be scaled prior to printing. Further, the scaling parameter is only known at the time of decoding of the data stream, therefore, the scaling must be performed in real time.

However, in conventional scaling methods, the scaling matrices are calculated offline and loaded into the signal processing system. Such conventional methods are ineffective when the scaling factors are only known at the time of signal access, and access must be provided in real time. Although having a pre-optimized scaling method is a reasonable expectation for applications where there may be a finite set of supported scaling factors, it does not allow for on-the-fly (e.g., real time) determination of scaling factors. For example, in inkjet printing, the paper may stretch during the printing of each component so that the images for the separate color components should be scaled in real time to compensate for this distortion. Such "real time" scaling factors would require real-time measurement, since they are determined by average job coverage, paper quality and content, ambient conditions, etc.

SUMMARY OF THE INVENTION

In view of the foregoing and other problems, disadvantages, and drawbacks of the conventional systems and methods, the present invention has been devised having as its objective, to provide a method and system for scaling a signal (e.g., a digital signal) sample rate which may operate, for example, in the transform domain, in the sample domain, or between domains.

The present invention includes an inventive method for scaling a signal sample rate (e.g., time sample rate or spatial sample rate). The inventive method includes interpolating between at least two scaling ratios to calculate an arbitrary scaling ratio, using a predetermined interpolation algorithm, and scaling a sample rate for a first portion of the signal using a first scaling ratio, and a scaling a sample rate for a second portion of the signal using a second scaling ratio, to form a scaled signal having an average scaling ratio equal to the arbitrary scaling ratio. For instance, the predetermined interpolation algorithm may include an error diffusion (ED) algorithm.

Specifically, the signal may include an image signal (which may, for example, be part of a document to be printed) or acoustic signal. Further, the arbitrary scaling ratio may be determined in real time. In addition, scaling may include scaling a first block of the signal with a first scaling ratio, and scaling a second block of the signal with a second scaling ratio. In addition, scaling may include one dimensional or multi-dimensional scaling.

Further, scaling may be performed in a transform domain (e.g., discrete cosine transform (DCT) domain, a Fourier transform domain, and a wavelet domain), sample domain or between a plurality of domains.

For example, the inventive method for scaling a signal sample rate may include interpolating between two fixed discrete scaling ratios, $a_m$ and $a_k$, using a predetermined interpolation algorithm, to achieve an arbitrary scaling ratio, b (e.g., $a_k<b<a_m$.), and scaling a sample rate for a first portion of the signal using scaling ratio $a_m$ and scaling a sample rate for a second portion of the signal using a scaling ratio $a_k$, to form a scaled signal having an average scaling ratio equal to the arbitrary scaling ratio b.

For example, when the signal is an image signal, the scaled signal may include a scaled image signal which, when displayed, is visually perceived to have said arbitrary scaling ratio b.

In an exemplary embodiment, the inventive method may be implemented as part of a method for displaying a scaled image signal. In this case, the inventive method may include removing an entropy encoding from a compressed image signal to generate an image signal, interpolating between two fixed discrete scaling ratios, $a_m$ and $a_k$, using a predetermined interpolation algorithm (e.g., an error diffusion (ED) algorithm.), to achieve an arbitrary scaling ratio, b, scaling a sample rate for a first portion of the image signal using scaling ratio $a_m$, and scaling a sample rate for a second portion of said image signal using scaling ratio $a_k$, so that an average scaling ratio over the image signal is equal to the arbitrary scaling ratio b, to generate a scaled image signal, restoring entropy encoding to the image signal, and displaying the scaled image signal.

The present invention also includes an inventive system for scaling a signal sample rate. The inventive system includes a processing device (e.g., a processor and a scaler) for interpolating between at least two scaling ratios, using a predetermined interpolation algorithm (e.g., an error diffusion (ED) algorithm.), to calculate an arbitrary scaling ratio, and a scaler for scaling a sample rate for a first portion of the signal using a first scaling ratio, and scaling a sample rate for a second portion of the signal using a second scaling ratio, to form a scaled signal having an average scaling ratio equal to the arbitrary scaling ratio. The inventive system may also include a memory device for storing the first and second scaling ratios (e.g., a plurality of scaling ratios) and the predetermined algorithm.

In an exemplary embodiment, the inventive system may be implemented as a system for displaying a scaled image. The inventive system includes an input device for inputting an image signal, a processing device (e.g., a processor and a scaler) for interpolating between at least two scaling ratios, using a predetermined interpolation algorithm (e.g., an error diffusion algorithm), to calculate an arbitrary scaling ratio, b, and for scaling a sample rate for a first portion of said image signal using a first scaling ratio, $a_m$, and scaling a sample rate for a second portion of said image signal using a second scaling ratio, $a_k$, to form a scaled image signal having an average scaling ratio equal to the arbitrary scaling ratio, b (e.g., $a_k<b<a_m$), and a display device for displaying the said image using the scaled image signal, the scaled image being visually perceived to have the arbitrary scaling ratio b.

The present invention also includes a device (e.g., a display device, a printing device, or an audio device) which scales a signal (e.g., an image signal, which may, for example, be part of a document to be printed, or acoustic signal) sample rate according to the inventive method.

The present invention also includes a programmable storage medium tangibly embodying a program of machine-readable instructions executable by a digital processing apparatus to perform the inventive method for scaling a signal sample rate.

With its unique and novel features, the present invention provides a method and system for scaling a signal (e.g., a digital signal) sample rate (e.g., the time or spatial sample rate) which, unlike conventional methods, may operate in a transform domain, sample domain, or between domains (e.g., different domains). Further, the claimed method may be used to scale a signal sample rate in real time to provide faster and more efficient scaling.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF THE PREFERRED EMBODIMENTS OF THE INVENTION

Figure 1:
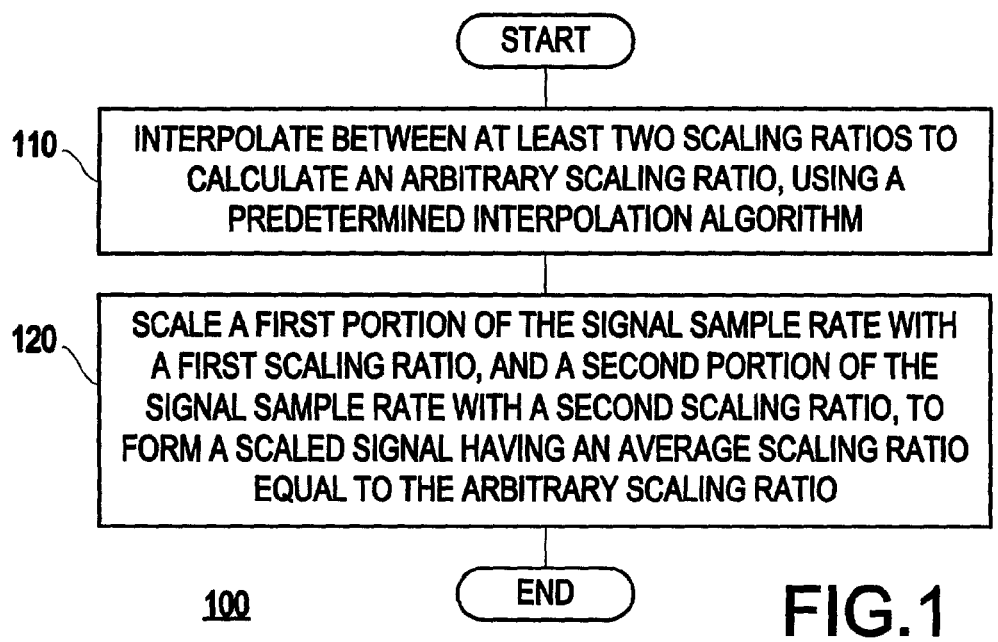
FIG. 1 is a flow chart illustrating an inventive method 100 for scaling a signal (e.g., a plurality of signals) sample rate according to the present invention.

Referring now to the drawings, FIG. 1 illustrates an inventive method 100 for scaling a signal (e.g., a plurality of signals) sample rate according to the present invention.

As shown in FIG. 1, the inventive method (100) includes interpolating (110) between the at least two scaling ratios to calculate an arbitrary scaling ratio, using a predetermined algorithm. The method may include, for example, scaling a first portion of the signal sample rate with a first scaling ratio, and scaling a second portion of the signal sample rate with a second scaling ratio, to form a scaled signal having an average scaling ratio equal to the arbitrary scaling ratio.

Unlike conventional methods for fast computation of scaling, which use fixed scaling ratios, in the claimed method, the arbitrary scaling ratio may be determined on-the-fly (e.g., in real time). An important feature of the present invention is that it can rapidly scale a signal sample rate by interpolating between fixed factors, and, moreover, can scale the sample rate either in the sample or in the tranform domain.

Specifically, the inventive method 100 is capable of scaling a signal (e.g., a digital signal) with computational efficiency in real time. The claimed method 100 may be used, for example, to scale an image signal (e.g., still image signal, which may be part of a document to be printed, or video signal), an acoustic signal, or any other signal which can be sampled.

More specifically, the inventive method 100 may use an algorithm capable of providing arbitrary scaling ratios that are determined on-the-fly (e.g., in real time). For instance, a predetermined algorithm (e.g., error diffusion (ED) algorithm) may be used to realize an arbitrary scaling factor between two fixed values. In other words, a collection of fixed scaling values may be determined and pre-calculated offline, and the inventive method can achieve scaling ratios that lie between these fixed values.

For example, the fixed scaling values (e.g., fixed scaling ratios) can be chosen, to allow using a conventional scaling method, or can be generated for use in the inventive method 100. Because the algorithms for implementing the fixed scaling values can be pre-calculated based on any number of prior art fast-scaling algorithms, scaling in the inventive method 100 can be performed either any one of many domains (e.g., in the transform domain or in the sample domain). Further, the algorithm is also appropriate for implementation in software or field programmable gate array (FPGA) hardware.

An important application of the inventive method 100 is in scaling compressed data signals. For instance, the inventive method 100 may be used to scale a compressed image, print, or audio file. For example, the inventive method 100 may be used to scale a still image signal compressed according to the standards of the Joint Photographic Experts Group (JPEG) or scale a video signal compressed according to the standards of the Moving Pictures Experts Group (MPEG) or an audio file compressed according to MP3 format, etc.

Data compression algorithms typically include a transform coding step. Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be, for example, an image, a video clip, an audio file, etc.

The transform function is usually chosen to reflect some quality of the phenomenon being coded. Three common transforms are the Fourier Transform, Discrete Cosine Transform (DCT) and the wavelet transform. For example, in coding of still images and motion pictures, the Fourier transform or DCT may be used to analyze the data into frequency terms or coefficients.

Often, the objective of transforming the data is that the transformed data may be represented more compactly. Given the phenomenon of being transformed, there is generally a concentration of the information into a few frequency coefficients. Therefore, the transformed data can often be more economically encoded or compressed than the original data. This is the general principle which makes transform coding useful to compress certain types of data.

That is, appropriate transform coding helps to minimize storage space or transmission time over a communication link.

An example of transform coding is provided in the Joint Photographic Experts Group (JPEG) international standard for still image compression, as defined by ITU-T Rec. T81 (1992) IISO/IEC 10918-1: 1994, Information Technology—Digital Compression, and Coding of Continuous-tone Still Images, Part 1: Requirements and Guidelines.

Another example is the Moving Pictures Experts Group (MPEG) international standard for motion picture compression, defined by ISO/IEC 11172: 1993, Information Technology-Coding of Moving Pictures and Associated Audio for Digital Storage Media at up to About 1.5 Mbits/s. This MPEG-1 standard defines a video compression (Part 2 of the standard). A more recent MPEG video standard (MPEG-2) is defined by ITU-T Rec. H262IISO/IEC 13818-2: 1996 Information Technology-Generic Coding of Moving Pictures and Associated Audio-Part 2: Video.

All three of these international image data compression standards use the DCT on 8×8 blocks of samples to achieve image compression. DCT compression of images is used herein to give illustrations of the general concepts set forth below. A complete explanation of the DCT can be found in Chapter 4 "The Discrete Cosine Transform (DCT)" in W. B. Pennebaker and J. L. Mitchell, JPEG: Still Image Data Compression Standard, Van Nostrand Reinhold: New York, (1993).

In any technology and for any phenomenon represented by digital data, the data before a transformation is performed are referred to as being "in the sample domain". After a transformation is performed, the new data is often called "transform data" or "transform coefficients", and referred to as being "in the transform domain". Unless the context makes another meaning clear, the term "transform domain" will refer to the two-dimensional transform domain. The function used to take data from the sample (e.g., pixel) domain to the transform domain is called the "forward transform". The inverse of the forward transform, which takes data from the transform domain to the sample domain, is called the respective "inverse transform".

In general, the forward transform will produce real-valued data, not necessarily integers. To achieve data compression, the transform coefficients are converted to integers by the process of quantization. The resulting integers are then passed on for possible further encoding or compression before being stored or transmitted.

To decode the data, the quantized coefficients are multiplied by the quantization values to give new "dequantized coefficients". The process of quantization by factor q followed by dequantization (also called inverse quantization) can thus be described as "rounding to the nearest multiple of q". The quantization values are chosen so that the loss of information in the quantization step is within some specified bound.

For example, for image data, one quantization level is usually the smallest change in data that can be perceived. It is quantization that allows transform coding to achieve good data compression ratios. A good choice of transform allows quantization values to be chosen which will significantly cut down the amount of data to be encoded.

For example, the DCT is typically chosen for image compression because the human visual system is less sensitive to the high frequency components. This means that the coefficients relating to those components to which the visual system is less sensitive, namely the high-frequency components, may be quantized using large quantization values without loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the display of image data generally accept input in the form of integers. For this reason, a transform decoder generally includes a step that converts the non-integer data from the inverse transform to integer data, either by truncation or by rounding to the nearest integer.

The purpose of image compression is to represent images with less data in order to save storage costs or transmission time and costs. The most effective compression is achieved by approximating the original image, rather than reproducing it exactly.

The JPEG standard allows the interchange of images between diverse applications and opens up the capability to provide digital continuous-tone color images in multimedia applications. JPEG is primarily concerned with images that have two spatial dimensions, contain grayscale or color information, and possess no temporal dependence, as distinguished from the MPEG (Moving Pictures Experts Group) standard.

The amount of data in a digital image can be extremely large, sometimes being millions of bytes. JPEG compression can reduce the storage requirements by more than an order of magnitude and improve system response time in the process.

One of the basic building blocks for JPEG is the (one-dimensional) DCT. This transform decomposes the data into its frequency components. Since the human visual system response is very dependent on spatial frequency, by decomposing an image into a set of waveforms, each with a particular spatial frequency, it is possible to separate the image structure the eye can see easily from the structure that is less perceptible. The DCT provides from this point of view an adequate decomposition. Another important ingredient of JPEG is the quantization of the DCT coefficients using empirically determined quantization values.

The two basic components of an image compression/decompression system are the encoder and the decoder. The encoder compresses the "source" image (the original digital image) and provides an output of compressed data (or coded data). The compressed data may be either stored or transmitted, but at some point are fed to the decoder. The decoder recreates or "reconstructs" an image from the compressed data.

In general, a data compression encoding system may include three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data.

The encoder may require external tables. That is, tables specified externally when the encoder is invoked. Generally, there are two classes of tables; model tables that are needed in the procedures that generate the descriptors, and entropy-coding tables that are needed by the JPEG entropy-coding procedures.

JPEG uses two techniques for entropy encoding: Huffman coding and arithmetic coding. Similarly to the encoder, the decoder may include basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect-ratio, pixel shape, orientation of image, etc.

Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the functions of the segment.

To perform a display (or print or audio) operation, it may be necessary for the display device to scale an image to a larger or smaller size. The scaling of the images is a linear operation. The array of coefficients describing the intensity of the colors of the pixels of the image is transformed to an array of coefficients of the scaled image by a matrix operation. This transformation may be performed in any representation of the image, but may depend on such a representation. As long as the representation is linear with respect to the pixel values the transformation stays linear.

The scale factor is a number which expresses the ratio of the number of points in the image before and after the scaling. Usually the scaling is performed blockwise, where the size the block (which may be the entire signal) is determined by the scale factor, the demanded efficiency of the operation and the quality of the resulting signal. Choosing larger blocks may yield better quality but lesser efficiency. The scale factors with small integers as denominators and numerators allow smaller blocks, larger integers may force larger blocks.

It should be noted that scaling operations are not uniquely defined. For example, in the case of down sampling, the algorithm which computes the value of a certain pixel of the scaled image will use as input the pixel values of a few places of the original image. The computation will be, in general, a certain average of these input values.

A priori there are many averages possible, leading to different scaling algorithms. There is a large variety of possible scaling algorithms which give rise to equally reasonable scaling results. However, only a small number of such scaling algorithms are "faithful". Faithful means 1) that the algorithm preserves local average color levels, so that the general perception of the scaled signal is similar to the original, and 2) that the blocks of the scaled signal have the same characteristic as the input image; e.g., if the input signal has samples in the range [0,1], then the scaled signal should also be in the range [0,1].

Therefore, the inventive method may be implemented as part of an image processing method which includes receiving a compressed image signal, removing an entropy encoding from the compressed image signal, scaling portions of the image signal with one of at least two fixed discrete scaling ratios, $a_m$, and other portions with $a_k$, so that an average scaling ratio over the signal is equal to an arbitrary scaling ratio b to generate a scaled image signal, restoring entropy encoding to the scaled image signal, and displaying the scaled image signal.

Figure 2:
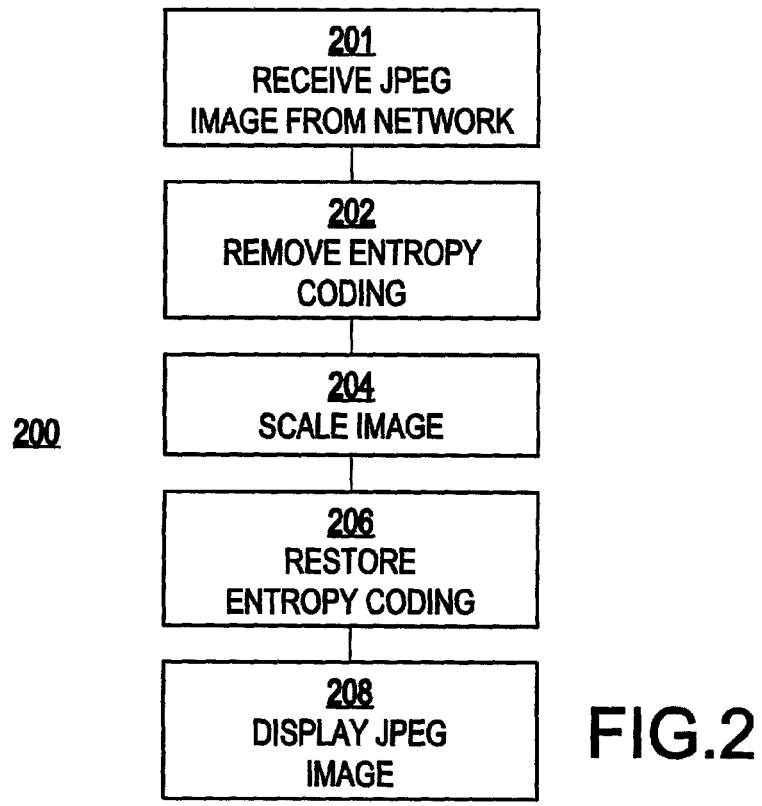
FIG. 2 is a flow chart illustrating a particular implementation 200 of the inventive method according to the present invention.

For example, FIG. 2 shows a possible implementation (e.g., an image processing method) of the inventive method 100 according to claimed invention. Specifically, FIG. 2 illustrates an image processing method 200 which may be used to scale a compressed image signal (e.g., a JPEG compressed image signal). As shown in FIG. 2, in the image processing method 200, a JPEG image is received (201) from a network. Then entropy coding is removed (202) from the image, so that the quantized DCT coefficients are available. The image is then scaled (204) according to the inventive method. Entropy coding is restored (206) so that the image is again in JPEG format, and the image is displayed 208. Display 208 can take place, for example, on a computer screen or on a printed page.

Further, in the inventive method, the solution provided may perform one-dimensional (1-D) scaling (or multi-dimensional scaling), with an arbitrary scaling factor. Although one exemplary embodiment described above uses JPEG compressed data, it should be understood by those skilled in the art that the principles of the invention can be applied to any compressed image data as well. For example, the inventive method may be applied to MPEG compressed data or data compressed by other compression techniques that utilize the DCT or wavelet transforms that separate into orthogonal one-dimensional transforms.

In the inventive method 100, for example, one-dimensional scaling operations may be described by consecutive scaling algorithms of the blocks by one of two chosen scaling algorithms with appropriate scale factors. The claimed method does not necessarily include scaling of each block of the data signal. More specifically, the inventive method may assume that there is a given collection $\{A_n\}$ of fixed, pre-calculated scaling matrices available for use in the inventive method (e.g., supported in the system implementing the inventive method), with corresponding scaling ratios $\{a_n\}$. Further, it may be assumed that the matrices $\{A_n\}$ all operate on integer multiples of N points of data at a time. In other words, all matrices may operate on collections of the same block size and aspect ratio.

The inventive method may also assume that these matrices represent one-dimensional scaling, since multi-dimensional scaling is a separable operation into the product of 1-D scaling and, therefore, the inventive method can be generalized to multi-dimensional scaling. For example, "Hybrid domain processing of multidimensional transformed data" (U.S. patent application Ser. No. 09/588,477, filed on Jun. 7, 2000, assigned to the present assignee and incorporated by reference herein) suggests computational methods for performing efficient calculations on data that are in the DCT domain on one axis and the sample domain on the other axis. In that disclosure, the scaling of images with more colors (such as RGB or CMYK) is done by repetition of the scaling on each of the colors separately.

More specifically, the inventive method 100 may use a predetermined algorithm to interpolate between at least two scaling ratios (e.g., fixed, discrete scaling ratios), $a_k$ and $a_m$. This predetermined algorithm may include, for example, an error diffusion (ED) algorithm.

In printing technology, an error diffusion (ED) algorithm may be used as a halftone algorithm. In short, the ED algorithm distributes the pixels so that the average is perceived as a certain gray level.

For example, suppose it is desired to scale pixels by $a_k < b < a_m$, where b is not in $\{a_n\}$. In the inventive method 100, the ED algorithm may be used so that the average scaling factor is perceived to be b although the actual scaling is done locally with the factors $a_k$ and $a_m$.

If the $\{a_n\}$ are not close to b, scaling artifacts can be realized in the image. Specifically, the ED algorithm (e.g., the ED process) may scale different image blocks by different amounts, so that the larger the value given by $a_m - a_k$, the more marked the local scaling differences between blocks. However, this is by no means a limiting factor of the inventive method, since the required mesh (i.e., largest distance between adjacent points) of $\{a_n\}$ can be determined by analysis of sample images offline.

Further, the inventive method can be combined with any number of other scaling methods to achieve arbitrary scaling with computational efficiency. For example, as noted above, another scaling method (e.g., a conventional method) may be used to determine algorithms for the fixed scaling ratios and the inventive method 100 may be used to interpolate between the scaling ratios to calculate an arbitrary scaling ratio, using a predetermined algorithm. The inventive method 100 may, therefore, scale portions of the signal with one of the scaling ratios, and other portions with another scaling ratio, to form a scaled signal having an average scaling ratio equal to the arbitrary scaling ratio.

One important application of the inventive method 100, therefore, is scaling JPEG-encoded images purely in the DCT domain, for high-throughput production printing or fast image display. However, the inventive method 100 is easily extendible to sample-domain, wavelet-domain, and interdomain (e.g., JPEG-to-wavelet) scaling, since the invention can use any pre-calculated scaling algorithm.

EXAMPLE

A simple example of how the inventive method 100 may be used to scale a signal follows.

Suppose it is provided that $a_m=4/8$ and $a_k=5/8$, and that $A_m$ is designed to transform 2 DCT blocks into 1 DCT block, and $A_k$ is designed to transform 8 DCT blocks into 5 DCT blocks. Take $b=9/16$. The ED algorithm partitions the image into groups of 8 and 2 DCT blocks, where the 2-block groups are scaled with $A_m$ and the 8-block groups are scaled with $A_k$. In order for the scaling to work correctly to produce this b, for each 8 blocks scaled to 5 blocks, 8 blocks have to be scaled to 4 blocks, although the 8 blocks scaled to 4 do not have to all be contiguous—they can be located in pairs.

Figure 3:
FIG. 3 provides an example of an image for which the signal sample rate was scaled according to the present invention.

For example, consider 16 contiguous blocks, $B_1 \ldots B_{18}$. Scale $B_1$ & $B_2$, $B_9$ & $B_4$, $B_5$ & $B_8$, and $B_{15}B_{18}$ all 2:1; scale block $B_7 \ldots B_{14}$ by 8:5. The partition may be performed so that over the image space, half of the blocks will be scaled with $A_m$ and the other half with $A_k$. The resulting 9/16 scaled image is provided in FIG. 3, where it can be seen that the appearance of the image is consistent with scaling each block by a factor of 9/16.

Of course, this algorithm could also be used to calculate arbitrary scaling factors; e.g., 0.56, where b does not lie exactly halfway between two other scaling ratios.

Figure 4:
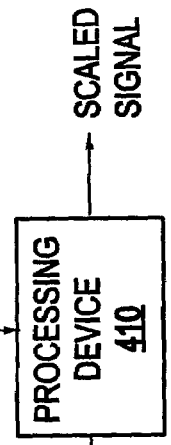
FIG. 4 illustrates an inventive system 400 for scaling a signal sample rate according to the present invention.

Referring again to the drawings, FIG. 4 illustrates an inventive system 400 (e.g., a computer system) for scaling a signal sample rate. As shown in FIG. 4, the inventive system 400 includes a processing device 410 for interpolating between at least two scaling ratios to calculate an arbitrary scaling ratio, using a predetermined algorithm (e.g., an error diffusion (ED) algorithm). Further, the processing device 410 may scale a sample rate for a first portion of the signal using a first scaling ratio, and scale a sample rate for a second portion of the signal using a second scaling ratio, to form a scaled signal having an average scaling ratio equal to said arbitrary scaling ratio.

Further, the processing device may include a first processor which performs an interpolation and a second processor (e.g., a scaler) which performs the scaling. In other words, in the inventive system 400 the scaling may be performed separate and apart from the interpolation. It should also be noted that the two scaling ratios used in the interpolation may be input to the processor 410 or may calculated by the processor 410 based on data input to the processor 410.

The inventive system 400 may also include a memory device for storing data and/or instructions including, for example, at least two scaling ratios and an algorithm (e.g., an error diffusion algorithm) for performing an interpolation. The system may also include an input device (e.g., a keyboard or mouse) for inputting data (e.g., scaling ratios) and instructions to the inventive system 400.

Specifically, the present invention may further include an inventive system for displaying a scaled image. This system may include, for example, an input device for inputting an image signal, a processing device for interpolating between at least two scaling ratios, using a predetermined interpolation algorithm, to calculate an arbitrary scaling ratio, b, and for scaling a sample rate for a first portion of the image signal using a first scaling ratio, $a_m$, and scaling a sample rate for a second portion of the image signal using a second scaling ratio, $a_k$, to form a scaled image signal having an average scaling ratio equal to the arbitrary scaling ratio, b, and a display device for displaying the scaled image using the scaled image signal so that the scaled image is visually perceived to have the arbitrary scaling ratio b.

The present invention also includes a device (e.g., a display device, a printing device, or an audio device) which scales a signal (e.g., an image signal, which may be part of a document to be printed, or acoustic signal) according to the inventive method.

Figure 5:
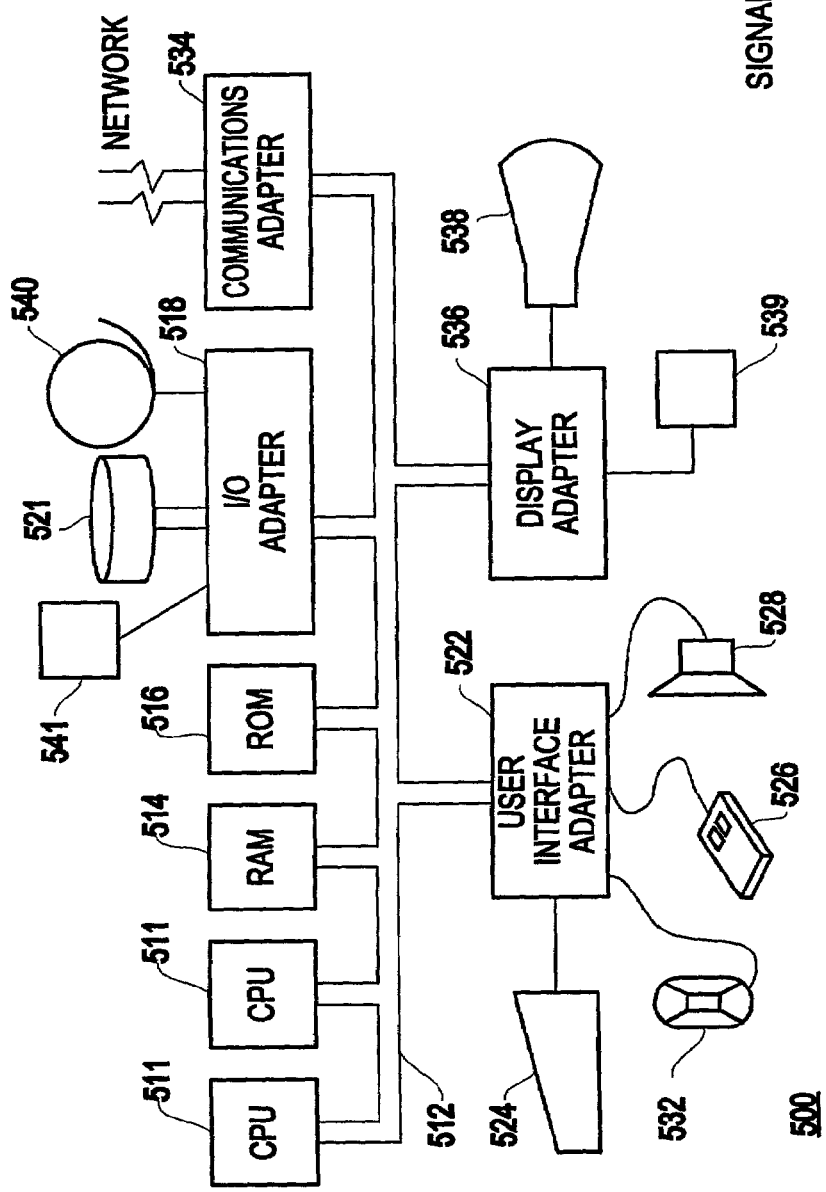
FIG. 5 illustrates a typical hardware configuration 500 which may be used for implementing the present invention.

Referring again to the drawings, FIG. 5 illustrates a typical hardware configuration which may be used for implementing the inventive system and method for scaling a signal. The configuration has preferably at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539. Further, an automated reader/scanner 541 may be included. Such readers/scanners are commercially available from many sources. In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 511 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

Figure 6:
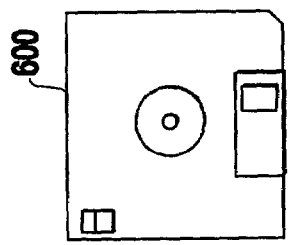
FIG. 6 illustrates a signal bearing medium 600 which may be used to store instructions for performing the inventive method according to the present invention.

This signal-bearing media may include, for example, a RAM 514 contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the computer server/CPU 511, or elsewhere, the instructions may be stored on a variety of machine-readable data storage media, such as DASD storage 521 (e.g, a conventional "hard drive" or a RAID array), magnetic tape 540, electronic read-only memory 516 (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

While the invention has been described in terms of preferred embodiments, those skilled in the art will recognize that the invention can be practiced with modification within the spirit and scope of the appended claims. For instance, although the invention may be discussed at times in terms of scaling an image signal sample rate, it should be understood that the invention can be practiced with other signals (e.g., acoustic signals, etc.).

With its unique and novel features, the present invention provides a method and system for scaling a signal (e.g., a digital signal) sample rate which, unlike conventional methods, may operate in the transform domain, sample domain or a plurality of domains (e.g., different domains). Further, the claimed method may be used to scale a signal sample rate in real time to provide faster and more efficient scaling.

We claim:

1. A method for scaling a signal sample rate, comprising:
    interpolating between at least two scaling ratios to calculate an arbitrary scaling ratio, using a predetermined interpolation algorithm comprising an error diffusion algorithm;
    scaling a sample rate for a first portion of said signal using a first scaling ratio, and scaling a sample rate for a second portion of said signal using a second scaling ratio, to form a scaled signal having an average scaling ratio equal to said arbitrary scaling ratio.

2. The method according to claim 1, wherein said signal comprises one of an image signal and an acoustic signal.

3. The method according to claim 2, wherein said scaling comprises scaling a sample rate for a first block of said signal using a first scaling ratio, and scaling a sample rate for a second block of said signal with a second scaling ratio.

4. The method according to claim 1, wherein said scaling is performed in a transform domain.

5. The method according to claim 4, wherein said transform domain comprises one of a discrete cosine transform (DCT) domain, a Fourier transform domain, and a wavelet domain.

6. The method according to claim 1, wherein said scaling is performed in a sample domain.

7. The method according to claim 1, wherein said scaling is performed between a plurality of domains.

8. The method according to claim 1, wherein said scaling is performed between two domains selected from a group consisting of a DCT domain, Fourier transform domain, wavelet domain, and sample domain.

9. The method according to claim 1, wherein said signal sample rate comprises one of a time sample rate and a spatial sample rate.

10. The method according to claim 1, wherein said arbitrary scaling ratio is determined in real time.

11. A display device which scales an image signal sample rate according to the method of claim 1.

12. A printing device which scales a printing signal sample rate according to the method of claim 1.

13. The method according to claim 1, wherein said scaling comprises one dimensional scaling.

14. The method according to claim 1, wherein said scaling comprises multi-dimensional scaling.

15. A method for scaling a signal sample rate comprising: interpolating between two fixed discrete scaling ratios, $a_m$ and $a_k$, using a predetermined interpolation algorithm comprising an error diffusion algorithm, to achieve an arbitrary scaling ratio, b; and scaling a sample rate for a first portion of said signal using scaling ratio $a_m$ and scaling a sample rate for a second portion of said signal using a scaling ratio $a_k$, to form a scaled signal having an average scaling ratio equal to said arbitrary scaling ratio b.

16. The method according to claim 15, wherein said signal comprises an image signal, and wherein said scaled signal comprises a scaled image signal which, when displayed, is visually perceived to have said arbitrary scaling ratio b.

17. A method for displaying a scaled image comprising:
    removing an entropy encoding from a compressed image signal to generate an image signal;
    interpolating between two fixed discrete scaling ratios, $a_m$ and $a_k$, using a predetermined interpolation algorithm comprising an error diffusion algorithm, to achieve an arbitrary scaling ratio, b;
    scaling a sample rate for a first portion of said image signal using scaling ratio $a_m$, and scaling a sample rate for a second portion of said image signal using scaling ratio $a_k$, so that an average scaling ratio over said image signal is equal to said arbitrary scaling ratio b, to generate a scaled image signal;
    restoring entropy encoding to said scaled image signal; and displaying said scaled image signal.

18. A system for scaling a signal sample rate, comprising:
    a processing device for interpolating between at least two scaling ratios, using a predetermined interpolation algorithm comprising an error diffusion algorithm, to calculate an arbitrary scaling ratio; and
    a scaler for scaling a sample rate for a first portion of said signal using a first scaling ratio, and scaling a sample rate for a second portion of said signal using a second scaling ratio, to form a scaled signal having an average scaling ratio equal to said arbitrary scaling ratio.

19. The system according to claim 18, further comprising: a memory device for storing said at least two scaling ratios and said predetermined algorithm.

20. The system according to claim 13, wherein said processing device comprises a first processor for performing an interpolation and said scaler comprises a second processor for scaling a signal sample rate.

21. A system for displaying a scaled image, comprising:
    an input device for inputting an image signal;
    a processing device for interpolating between at least two scaling ratios, using a predetermined interpolation algorithm comprising an error diffusion algorithm, to calculate an arbitrary scaling ratio, b; and a scaler for scaling a sample rate for a first portion of said image signal using a first scaling ratio, $a_m$, and scaling a sample rate for a second portion of said image signal using a second scaling ratio, $a_k$, to form a scaled image signal having an average scaling ratio equal to said arbitrary scaling ratio, b; and a display device for displaying said scaled image using said scaled image signal, said scaled image being visually perceived to have said arbitrary scaling ratio b.

22. The system according to claim 21, wherein $a_k<b<a_m$.

23. The system according to claim 21, wherein said sample rate comprises one of a time sample rate and a spatial sample rate.

24. The system according to claim 21, wherein said processing device comprises a first processor for performing an interpolation and said scaler comprises a second processor for scaling a signal sample rate.

25. A programmable storage medium tangibly embodying a program of machine-readable instructions executable by a digital processing apparatus to perform a method for scaling a signal sample rate, said method comprising:

interpolating between at least two scaling ratios to calculate an arbitrary scaling ratio, using a predetermined interpolation algorithm comprising an error diffusion algorithm; and scaling a sample rate for a first portion of said signal using a first scaling ratio, and scaling a sample rate for a second portion of said signal using a second scaling ratio, to form a scaled signal having an average scaling ratio equal to said arbitrary scaling ratio.

* * * * *